US006503658B1

(12) United States Patent
Klein et al.

(10) Patent No.: US 6,503,658 B1
(45) Date of Patent: Jan. 7, 2003

(54) BIPOLAR ELECTROCHEMICAL BATTERY OF STACKED WAFER CELLS

(75) Inventors: Martin G. Klein, Brookfield, CT (US); Paula Ralston, Danbury, CT (US); Robert Plivelich, Waterbury, CT (US)

(73) Assignee: Electro Energy, Inc., Danbury, CT (US)

( * ) Notice: Subject to any disclaimer, the term of this patent is extended or adjusted under 35 U.S.C. 154(b) by 0 days.

(21) Appl. No.: 09/902,871

(22) Filed: Jul. 11, 2001

(51) Int. Cl.[7] .................. H01M 10/18; H01M 6/48; H01M 6/00
(52) U.S. Cl. .................. 429/210; 429/157; 429/162; 429/124; 429/127; 429/82; 29/623.1; 29/623.3
(58) Field of Search ................. 429/157, 210, 429/162, 124, 127, 82, 176; 29/623.1, 623.3

(56) References Cited

U.S. PATENT DOCUMENTS

| 3,717,505 A | 2/1973 | Unkle, Jr. et al. |
| 3,898,099 A | 8/1975 | Baker et al. |
| 4,098,965 A | 7/1978 | Kinsman |
| 4,098,967 A | 7/1978 | Biddick et al. |

(List continued on next page.)

FOREIGN PATENT DOCUMENTS

| EP | 0 195 567 | 9/1986 |
| EP | 0 284 063 | 9/1988 |
| EP | 0 359 557 | 3/1990 |

(List continued on next page.)

OTHER PUBLICATIONS

Sakai et al., "Nickel–metal hydride battery using microencapsulated alloys", Journal of the Less–Common Metals, vol. 172–174 (1991), pp. 1194–1204.

Sakai et al., "Effects of Microencapsulation of Hydrogen Storage Alloy on the Performances of Sealed Nickel/Metal Hydride Batteries", J. Electrochem. Society, Mar. 1987, pp. 558–562.

Wada et al., "Production of copper–alloy complex granules for nickel/metal hydride electrodes", Journal of Alloys and Compounds, vol. 192 (1993), pp. 164–166.

*Primary Examiner*—Stephen Kalafut
*Assistant Examiner*—Angela J. Martin
(74) *Attorney, Agent, or Firm*—Kenyon & Kenyon

(57) ABSTRACT

The bipolar electrochemical battery of the invention comprises:
a stack of at least two electrochemical cells electrically arranged in series with the positive face of each cell contacting the negative face of an adjacent cell, wherein each of the cells comprises
(a) a negative electrode;
(b) a positive electrode;
(c) a separator between the electrodes, wherein the separator includes an electrolyte;
(d) a first electrically conductive lamination comprising a first inner metal layer and a first polymeric outer layer, said first polymeric outer layer having at least one perforation therein to expose the first inner metal layer, said first electrically conductive lamination being in electrical contact with the outer face of the negative electrode; and
(e) a second electrically conductive lamination comprising a second inner metal layer and a second polymeric outer layer, said second polymeric outer layer having at least one perforation therein to expose the second inner metal layer, said second electrically conductive lamination being in electrical contact with the outer face of the positive electrode; wherein the first and second laminations are sealed peripherally to each other to form an enclosure including the electrodes, the separator and the electrolyte.

35 Claims, 10 Drawing Sheets

U.S. PATENT DOCUMENTS

| | | |
|---|---|---|
| 4,110,519 A | 8/1978 | Nilsson |
| 4,204,036 A | 5/1980 | Cohen et al. |
| 4,312,928 A | 1/1982 | Van Deutekom |
| 4,404,267 A | 9/1983 | Iacovangelo et al. |
| 4,487,817 A | 12/1984 | Willems et al. |
| 4,567,119 A | 1/1986 | Lim |
| 4,677,041 A * | 6/1987 | Specht .................. 429/206 |
| 4,728,586 A | 3/1988 | Venkatesan et al. |
| 4,844,999 A | 7/1989 | Oshitani et al. |
| 5,043,233 A | 8/1991 | Kameoka et al. |
| 5,132,177 A | 7/1992 | Kawano et al. |
| 5,234,779 A | 8/1993 | Mix et al. |
| 5,374,490 A | 12/1994 | Aldecoa |
| 5,393,617 A * | 2/1995 | Klein ..................... 429/59 |
| 5,451,474 A | 9/1995 | Wu et al. |
| 5,478,363 A | 12/1995 | Klein |
| 5,492,543 A | 2/1996 | Lim |
| 5,552,242 A | 9/1996 | Ovshinsky |
| 5,552,243 A | 9/1996 | Klein |
| 5,585,142 A | 12/1996 | Klein |
| 5,611,823 A | 3/1997 | Klein |
| 5,698,342 A | 12/1997 | Klein |
| 6,146,780 A * | 11/2000 | Cisar et al. .................. 424/34 |

FOREIGN PATENT DOCUMENTS

| | | |
|---|---|---|
| EP | 0 503 622 | 9/1992 |
| EP | 0 530 659 | 3/1993 |
| EP | 0 557 522 | 9/1993 |
| GB | 1 489 538 | 10/1977 |
| JP | 60 190570 | 9/1985 |
| JP | 62 297471 | 12/1987 |
| JP | 63 4829 | 1/1988 |
| JP | 1 195673 | 8/1989 |
| JP | 2 243768 | 9/1990 |
| JP | 2 253557 | 10/1990 |
| JP | 3 245460 | 11/1991 |
| JP | 4 359864 | 12/1992 |
| JP | 5 41210 | 2/1993 |
| JP | 6 163072 | 6/1994 |

* cited by examiner

BIPOLAR ELECTROCHEMICAL BATTERY OF STACKED WAFER CELLS

This invention was made with Government support under contract NAS3-27787 awarded by the National Aeronautic and Space Administration. The Government has certain rights in this invention.

FIELD OF INVENTION

The present invention relates generally to packaging methods and fabrication techniques for making electrochemical cells and multi-cell batteries. In particular, the invention relates to electrochemical cell constructions useful for primary and rechargeable bipolar battery structures that have a high energy storage capacity and efficient battery performance. More specifically, this invention relates to electrochemical cells including positive and negative electrode structures and methods of making such cells that are capable of being stacked in a multi-cell battery construction.

BACKGROUND OF THE INVENTION

Multi-cell batteries are typically constructed in a broad range of electrochemical systems and are often packaged in cylindrical or prismatic housings. Individual cells are connected in series by conductive links to make the multi-cell batteries. Such construction approaches provide for good sealing of the individual cell compartments and for reliable operation. However, such constructions allocate a large fraction of the multi-cell battery's weight and volume to the packaging and, thus, do not make full use of the energy storage capability of the active components of the cell. For improving battery energy storage capacity on a weight and volume basis, packaging approaches are sought that reduce packaging weight and volume and that provide stable battery performance and low internal resistance.

These objectives have led to the pursuit of a bipolar construction in which an electrically conductive bipolar layer serves as the electrical interconnection between adjacent cells, as well as a partition between the cells. In this type of construction, the current flows perpendicular from cell to cell over the entire cell area thus increasing high rate capability. However, in order for the bipolar construction to be successfully utilized, the bipolar layer should be sufficiently conductive to transmit current from cell to cell, chemically stable in the cell's environment, capable of making and maintaining good electrical contact to the electrodes, and capable of being electrically insulated and sealable around the boundaries of the cell so as to contain electrolyte in the cell. These features are more difficult to achieve in rechargeable batteries due to the charging potential that can accelerate corrosion of the bipolar layer and in alkaline batteries due to the creep nature of the electrolyte. Achieving the proper combination of these characteristics has proven to be very difficult.

For maintenance-free operation, it is desirable to operate rechargeable batteries in a sealed configuration. However, sealed bipolar designs typically utilize flat electrodes and stacked-cell constructions that may be structurally poor for containment of the gases present or generated during cell operation. In a sealed cell construction, gases are generated during charging that need to be chemically recombined within the cell for stable operation. To minimize weight of the structures used to provide the gas pressure containment, the battery should operate at relatively low pressure. The pressure containment requirement creates additional challenges on designing a stable bipolar configuration.

Also, the need for removal of heat generated during normal operation of batteries may be a limiting design factor in bipolar construction due to the compact nature of the construction. Thus, an optimum bipolar design should provide for removal of heat generated during operation.

In U.S. Pat. No. 5,393,617, electrode structures that are adaptable for primary and electrically rechargeable electrochemical wafer cells are disclosed. According to an embodiment set forth in that patent, a flat wafer cell includes conductive, carbon-filled polymeric outer layers that serve as electrode contacts and as a means of containment of the cell. Multi-cell, high voltage batteries may be constructed by stacking individual cells. Specially formulated electrodes and processing techniques that are compatible with the wafer cell construction are particularly disclosed for a nickel-metal hydride battery system. The cell design and electrode formulation disclosed in the '617 patent provide for individual operation of a vented or sealed cell and/or for operation of these cells in a stacked array in an outer battery housing.

The foregoing construction approach of the '617 patent is advantageous and has proven to be flexible for designing batteries having different capacity, voltage and chemistry. However, scientists and engineers working under the direction of Applicant's assignee are continually seeking to develop further improved wafer cell and battery constructions, and methods of fabrication thereof.

ADVANTAGES AND SUMMARY OF THE INVENTION

The present invention provides a means for achieving desirable packaging benefits of bipolar construction for multi-cell batteries and of overcoming material and construction problems of some previous approaches. Although the materials of construction for each type of cell are specific to each battery chemistry, the general bipolar construction disclosed herein may be used for many types of electrochemical cells. In particular, several embodiments and examples that follow relate to the rechargeable nickel-metal hydride chemistry but may be generally adaptable to other chemistries.

An advantage of the present invention relates to providing a bipolar battery construction for primary and/or rechargeable multi-cell batteries that have improved energy storage capacity while providing stable and efficient battery performance, as well as long term chemical and physical stability.

Another advantage of the present invention relates to providing a bipolar battery construction using flat electrochemical cells having a sealed configuration.

Still another advantage of the present invention relates to providing a bipolar battery construction wherein nickel-hydride electrodes may be used.

These and still other advantages and benefits may be achieved by making a bipolar electrochemical battery comprising:

a stack of at least two electrochemical cells electrically arranged in series with the positive face of each cell contacting the negative face of an adjacent cell, wherein each of the cells comprises
(a) a negative electrode;
(b) a positive electrode;
(c) a separator between the electrodes, wherein the separator contains an electrolyte;
(d) a first electrically conductive lamination comprising a first inner metal layer and a first polymeric outer layer, said first polymeric outer layer having at least one perforation therein to expose the first inner metal layer, said first electrically conductive lamination being in electrical contact with the outer face of the negative electrode; and (e) a second electrically conductive lamination comprising a second inner metal layer and a second polymeric outer layer, said second polymeric outer layer having at least one perforation therein to expose the second inner metal layer, said second electrically conductive lamination being in electrical contact with the outer face of the positive electrode; wherein the first and second laminations are sealed peripherally to each other to form an enclosure including the electrodes, the separator and the electrolyte.

The present invention further relates to an electrochemical wafer cell comprising:

(a) a negative electrode;
(b) a positive electrode;
(c) a separator between the electrodes, wherein the separator contains an electrolyte;
(d) a first electrically conductive lamination comprising a first inner metal layer and a first polymeric outer layer, said first polymeric outer layer having at least one perforation therein to expose the first inner metal layer, said first electrically conductive lamination being in electrical contact with the outer face of the negative electrode; and
(e) a second electrically conductive lamination comprising a second inner metal layer and a second polymeric outer layer, said second polymeric outer layer having at least one perforation therein to expose the second inner metal layer, said second electrically conductive lamination being in electrical contact with the outer face of the positive electrode; wherein the first and second laminations are sealed peripherally to each other to form an enclosure including the electrodes, the separator and the electrolyte.

The present invention still further relates to an assembly for containing contents of a wafer cell, comprising:

(a) a first electrically conductive lamination comprising a first inner metal layer and a first polymeric outer layer, said first polymeric outer layer having at least one perforation therein to expose the first inner metal layer, said first electrically conductive lamination capable of being in electrical contact with a negative electrode; and
(b) a second electrically conductive lamination comprising a second inner metal layer and a second polymeric outer layer, said second polymeric outer layer having at least one perforation therein to expose the second inner metal layer, said second electrically conductive lamination capable being in electrical contact with a positive electrode, wherein the first and second laminations are capable of being sealed peripherally to each other to form an assembly for containing the contents of a wafer cell.

A further advantage of the present invention relates to enhanced conduction through the cell and/or adjacent cells due to the ease through which current may flow through the metal layers of the laminations exposed by the perforations.

Further advantages of this invention will be apparent to those skilled in the art from the following detailed description of the disclosed bipolar electrochemical batteries and methods for producing the bipolar electrochemical batteries, and of the wafer cells used therein.

DETAILED DESCRIPTION

While the following description of embodiments of the present invention is intended to provide detailed instructions that would enable one of ordinary skill in the art to practice the invention, the scope of the invention is not limited to the scope of the specific product or process details hereinafter provided.

Figure 1:
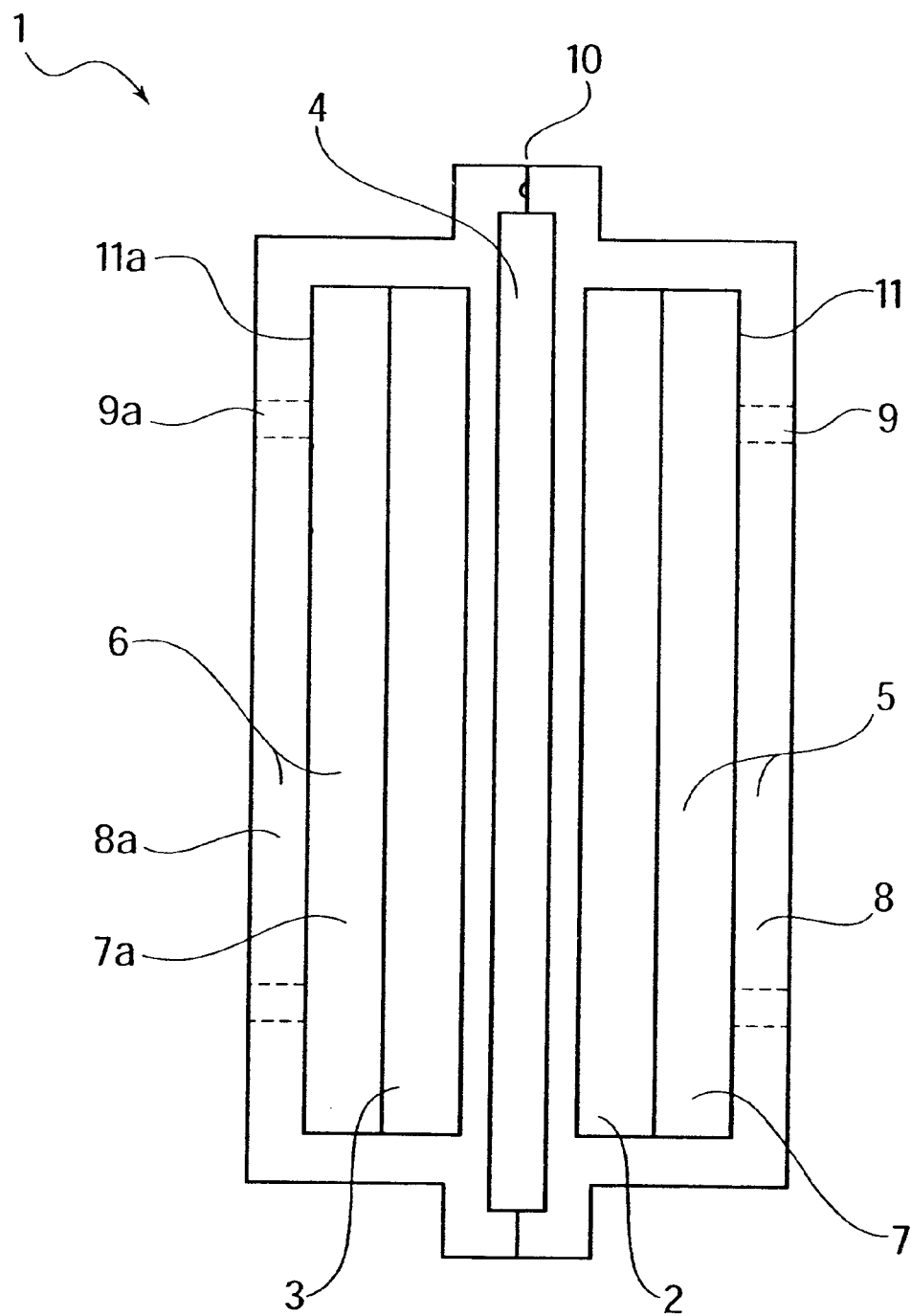
FIG. 1 shows an overview of a wafer cell embodiment of the invention.
Figure 2A:
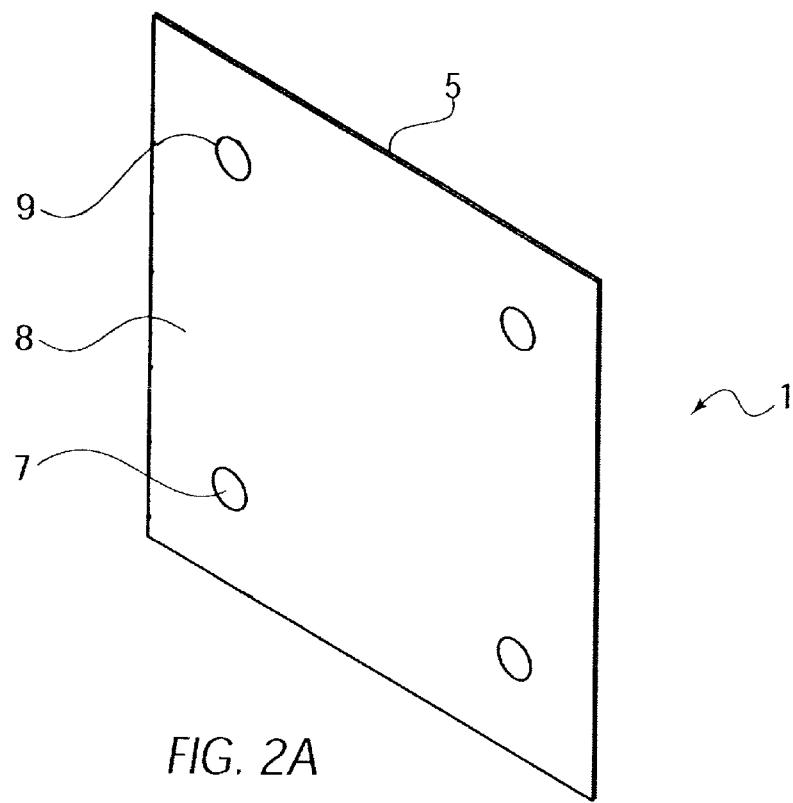
FIG. 2A shows a side view of a portion of a wafer cell embodiment of the invention and FIG. 2B shows a sectional view of a wafer cell embodiment of the invention.
Figure 2B:
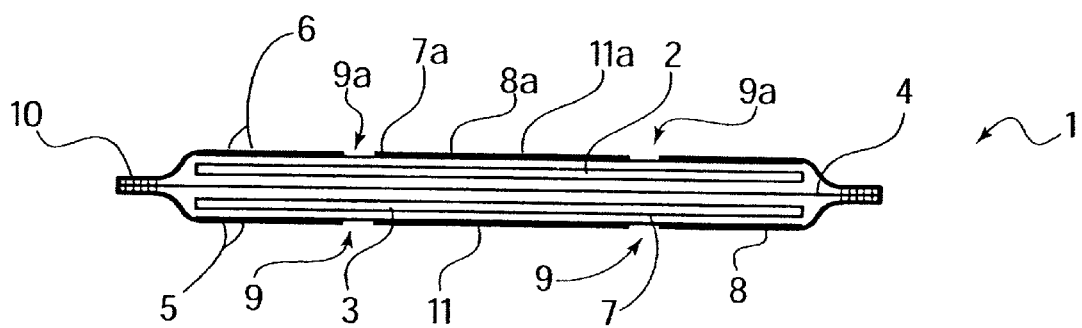

The bipolar electrochemical battery of the subject invention first relates to preparing an electrochemical wafer cell 1. FIGS. 1 and 2B show schematically illustrative embodiments of a wafer cell 1 comprised of a negative electrode 2 and a positive electrode 3. The electrodes are prevented from coming into direct physical contact with each other by a separator 4 and are contained between two outer layers: a first electrically conductive lamination 5 and a second electrically conductive lamination 6 that make electrical contact to the negative and positive electrodes, 2 and 3, respectively. As shown in FIGS. 1 and 2B, an embodiment of the invention comprises the electrochemical cell 1 wherein the electrodes, 2 and 3, the separator 4 between the electrodes and the two outer laminations, 5 and 6, are each substantially flat and in tight physical contact with the adjacent component, thereby advantageously permitting construction of a thin wafer cell.

The negative electrode 2 used in the present invention may be any negatively charged electrode known in the art. For example, the negative electrode 2 may be made of a material selected from the group of cadmium, iron, hydrogen, zinc, silver, metal hydride, lithium, lead, a lithium-carbon material, e.g. carbon containing lithium material, and mixtures thereof. Further materials for electrode 2 may include nickel hydrides, iron hydrides, lithium hydride, copper hydrides and mixtures thereof. In another embodiment of the present invention, the negative electrode 2 is a bonded metal hydride alloy powder that can electrochemically and reversibly store hydrogen. Such suitable electrodes include, but are not limited to, electrode materials disclosed in U.S. Pat. Nos. 4,487,817, 4,728,586, 5,552,243, 5,698,342 and 5,393,617. In particular, suitable alloy formulations may include, for example, what are commonly referred to as Mischmetal hydride alloys, which may be comprised of an alloy of hydride-forming metals such as Mn $Ni_{3.5}Co_{0.7}Al_{0.83}$, $AB_5$ type or $AB_2$ compositions.

The positive electrode 3 may also be any suitable positively charged electrode known in the art, including what is typically referred to as a nickel-type electrode, or more simply, as a nickel electrode. Nickel hydroxide is the active component of a nickel electrode, and examples of nickel electrodes are disclosed in U.S. Pat. No. 5,393,617, German Patent No. 491,498 and British Patent No. 917,291. For example, the electrode 3 may be a sintered, plastic bonded or pasted foam nickel electrode. Alternatively, the positive electrode 3 may be made of a material other than an oxide or hydroxide of nickel, as disclosed in the patents cited herein. Suitable materials for the positive electrode 3 may include, but are not limited to, oxygen, nickel, lithium, manganese, copper, cobalt, silver, an oxide or hydroxide of manganese, an oxide or hydroxide of copper, an oxide or hydroxide of mercury, an oxide or hydroxide of silver, an oxide or hydroxide of magnesium, an oxide or hydroxide of lithium (including electrodes used in lithium rechargeable batteries) and combinations thereof. In an embodiment of the invention, the negative electrode 2 and positive electrode 3 are flat and made in accordance with the teachings of U.S. Pat. Nos. 5,393,617 or 5,552,242.

Electrodes 2 and 3 each may also include current collectors for carrying current between adjacent cells. Such current collectors may not be necessary because the current path between adjacent electrodes is relatively short and the area of physical and electrical contact between adjacent cells is large relative to the total area of the adjacent components. In addition, the electrodes are typically conductive enough for cell operation without having current collectors that add weight and complexity to the cell.

The electrodes 2 and 3 may be prevented from coming into direct physical contact with one another by use of separator 4 which extends beyond the edge of the electrodes 2 and 3, as shown in the embodiments of FIGS. 1 and 2B. The separator 4 is typically made of synthetic resin fibers such as polyamide or polypropylene fibers. The separator 4 may also be made of a material including, but not limited to, inorganic layers or other suitable separator material known those skilled in the art. The separator 4 is flat and has a porous structure for absorbing and containing an electrolyte within the cell 1, in an embodiment of the invention.

Typically, for alkaline chemistries the electrolyte includes an aqueous solution of one or more alkali hydroxides such as lithium hydroxide, sodium hydroxide and potassium hydroxide. In an embodiment of the invention, the separator 4 comprises two layers of non-woven polyolifin and the electrolyte comprises an alkaline solution. In a further embodiment of a nickel-metal hydride system, the alkaline solution is a mixed hydroxide of potassium and lithium hydroxide.

Figure 3:
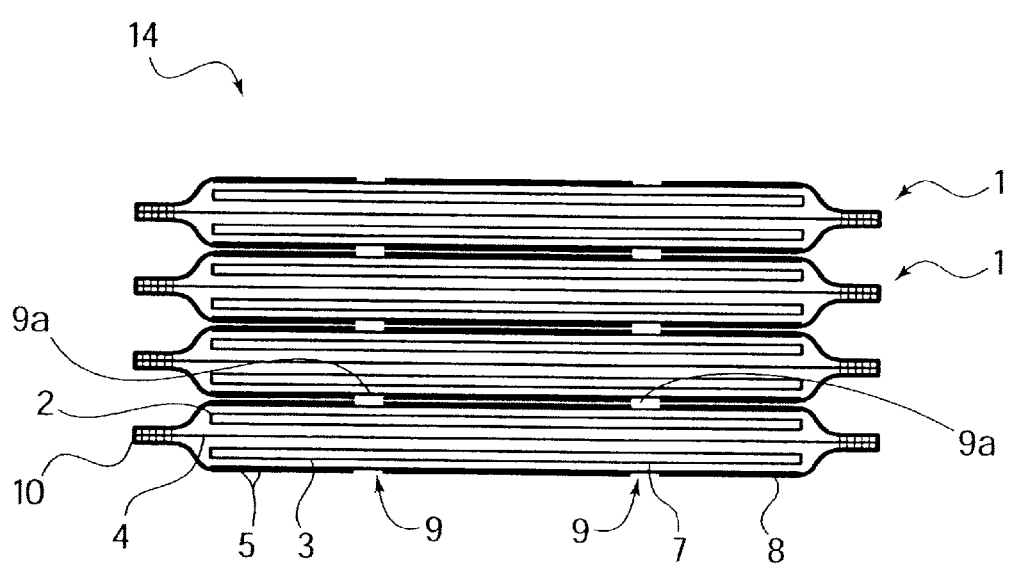
FIG. 3 shows a multi-cell stack of wafer cells, according to the invention.

The electrodes, 2 and 3, and separator 4 may be contained within the wafer cell 1 by use of a first electrically conductive lamination 5 and second electrically conductive lamination 6, which Applicant has determined provides advantages over prior approaches. The first lamination 5 is equal and opposite to the second lamination 6, as shown in the embodiments of FIGS. 1 and 2B. The first lamination 5 comprises a first inner metal layer 7 and an first polymeric outer layer 8. The first polymeric outer layer 8 has at least one perforation 9 or opening therein, as shown in the embodiment of FIG. 2A, to expose the first inner metal layer 7 and provide a contact point for conduction through the cell 1. Similarly, the second lamination 6 comprises a second inner metal layer 7a and a second polymeric outer layer 8a. The second polymeric outer layer 8a also has at least one perforation 9a therein to expose the second inner metal layer 7a and also provide a contact point for conduction through the cell 1. Perforations 9 and 9a may be aligned with respect to each other to provide optimum conduction from cell to cell, as shown in the embodiment of FIG. 3.

Metal layers 7 and 7a of the laminations may be made of any metallic material and in various shapes and sizes. For example, metal layers 7 and 7a are each made of a thin metal foil of the same size as that of the negative electrode 2 and positive electrode 3, respectively, and aligned with the respective electrode as shown in the embodiments of FIGS. 1, 2B and 3. Several layers may also be employed. Suitable materials for the metal layers 7 and 7a include, but are not limited to copper, aluminum, steel, silver, nickel and mixtures thereof, including plated materials readily known to those skilled in the art. The foil thickness may be as thin as practical, for example, between about 0.0003 inches and about 0.005 inches, depending upon design specifications and to meet the needs thereof.

In order to enhance electrical contact, a conductive paste or cement such as a conductive epoxy or other suitable material readily known to those skilled in the art may be applied between each of the metal layers and the respective electrode with which it is in contact. Thin layers of conductive cement 0.0005 to 0.001 inches thick may serve this purpose.

The first and second polymeric outer layers 8 and 8a of the laminations may be made of any suitable polymeric material including, but not limited to, nylon polypropylene, polyethylene, polysultone, polyvinyl chloride and mixtures thereof. The materials of polymeric outer layers 8 and 8a need not be electrically conductive. An advantage of this feature is that the choice of material for the polymeric outer layers is therefore not limited to such a requirement. In an embodiment, each layer 8 and 8a is a layer of polypropylene film, between about 0.001 and about 0.003 inches in thickness. Each layer 8 and 8a may also be heat sealable and chemically stable in the cell environment.

The first polymeric outer layer 8 may be affixed to the first inner metal layer 7 to form the lamination 5 by any suitable sealing mechanism which thereby creates a sealed interface 11. Similarly, the second polymeric outer layer 8a may be affixed to the second inner metal layer 7a to form the lamination 6 by any suitable sealing mechanism, which thereby also creates a sealed interface 11a. For example, suitable sealing mechanisms include, but are not limited to, use of bonding agents of asphalt, tar, neoprene, rubber, epoxy, cement and combinations thereof.

In one embodiment of the invention, a potential leakage path for the electrolyte from the cell 1 is along the interface (11, 11a) between the first or second inner metal layers (7, 7a) and the respective first or second polymeric outer layers (8, 8a) around the edge of the metal layer to the closest location of a perforation. To produce an effective seal, an appropriate contact material such as cement, which is chemically stable in the cell's electrolyte environment, may be applied around the edges of the perforation(s) in amounts such as about 0.0003 to 0.001 inches sufficient to cover the interface and thereby prevent any potential leakage. Suitable contact cements include, but are not limited to asphalt, tar, neoprene, rubber, epoxy, cement and combinations thereof.

In order for the electrodes, 2 and 3, the separator 4 between the electrodes and the electrolyte to be contained within an enclosed wafer cell, the first and second polymeric outer layers 8 and 8a of the laminations 5 and 6 may have a larger physical area than the electrodes around the entire perimeter of the adjacent electrode, as shown in FIGS. 1 and 2B. Additionally, the first and second polymeric outer layers 8 and 8a which also extend beyond the inner metal layers 7 and 7a, respectively, are advantageously affixed to each other to provide a seal around the perimeter of the wafer cell 1, in an embodiment of the invention. Such sealing along the perimeter, which may create a plastic to plastic joint 10, can be accomplished by any suitable known technique including, but not limited to, heat sealing or utilizing a cement or a filler material that bonds to the material of the polymeric outer layers 8 and 8a. Accordingly, this advantageously results in a sealed enclosure for the wafer cell 1.

The enclosed wafer cell 1 may be completely sealed or it may be provided with one or more vents or relief valves to relieve excess pressure built up during charging. Since the flat cell construction may not be an optimum physical configuration for a pressure-containment vessel, the use of hydride alloys that operate at atmospheric pressure may be particularly useful. If a completely sealed configuration is used, a design that is electrochemically limited by the capacity of the positive electrode may also be advantageous. For this type of design, oxygen gas is generated at the end of the charging cycle at the positive electrode before the total available hydrogen storage capacity of the hydride electrode is fully utilized. Oxygen produced at the positive electrode may migrate to the negative hydride electrode and chemically recombine with the hydrogen in the hydride electrode so as to help prevent excessive buildup of pressure. The chemical recombination of oxygen and hydrogen is referred to herein as the oxygen recombination reaction. Accordingly, the teachings of U.S. Pat. No. 5,393,617, disclosing, for example, means for enhancing the migration of oxygen gas to the negative electrode and for promoting efficient chemical recombination of the oxygen with hydrogen at the hydride electrode surface, may be of interest.

One skilled in the art would also appreciate that the wafer cell 1 may be fabricated in a dry state and provided with a fill port through one of the laminations 5, 6 for vacuum filling or pressure filling which then may be sealed with an appropriate patch. In this technique, the air in the cell may be vacuumed from the filing port provided in the cell and the differential pressure will force electrolyte into the pores of the electrodes and separators. Alternatively, the electrodes 2, 3 and separator 4 may be pre-moistened or pre-wet with an appropriate amount of electrolyte before the afore-referenced perimeter seal is made on the wafer cell 1. For example, the electrolyte quantity introduced into the cell may fill 60 to 90% of the pore volume of the electrodes and separators.

In an embodiment of the invention, the first electrically conductive lamination 5 is in electrical contact with the outer face of the negative electrode 2 via at least one perforation 9, as shown in FIGS. 1 and 2B. Similarly, the second electrically conductive lamination 6 is in electrical contact with the outer face of the positive electrode 3 via at least one perforation 9a, as also shown in FIGS. 1 and 2B. Thus, Applicant's lamination design including perforations 9 and 9a advantageously enables electrical contact to be made to the positive and negative faces of the cell 1, as well as through the cell 2 and/or adjacent cells. The size and spacing of perforations 9 and 9a may be determined by a number of design factors for optimum sealing and electrical current carrying capacity. For example, an arrangement is to keep the perforations 9 and 9a at least a ¼ inch from the foil edges. The size and the perforation spacing may be determined by the electric requirements of the cell.

Referring now to FIG. 3, an embodiment of a multi-cell battery stack 14 of the invention is shown therein which may be made by stacking several wafer cells 1. The wafer cells are electrically arranged in series with the positive face of each cell contacting the negative face of the adjacent cell. In this embodiment, the electric conduction path through the stack 14 is advantageously from the electrode to a metal foil layer, internally through the foil to a perforation, and through the perforation to the adjacent cell in the stack 14.

The end cells of the battery stack also may have metal foil contacts, as described in U.S. Pat. No. 5,393,617, to conduct the electric current from the battery stack to the battery terminals. The cell-to-cell contact or the contact between the end cells and the foil at the perforation points may also be enhanced by the use of a material such as conductive paste, cement or metallic filler disk. The compact stack assembly may be held in compression to ensure uniform physical contact between the adjacent cells and between the respective layers within each cell. The stack compression may be achieved by means of rigid end plates having external tie rods wrapped around the perimeter of the stack, or by having internal tie rods that penetrate through sealed holes provided in the individual electrochemical cells, as described for instance in U.S. Pat. No. 5,393,617. The holes may be sealed to prevent leakage and electrical contact between the tie rods and the electrically conductive components of the cell.

Figure 4:
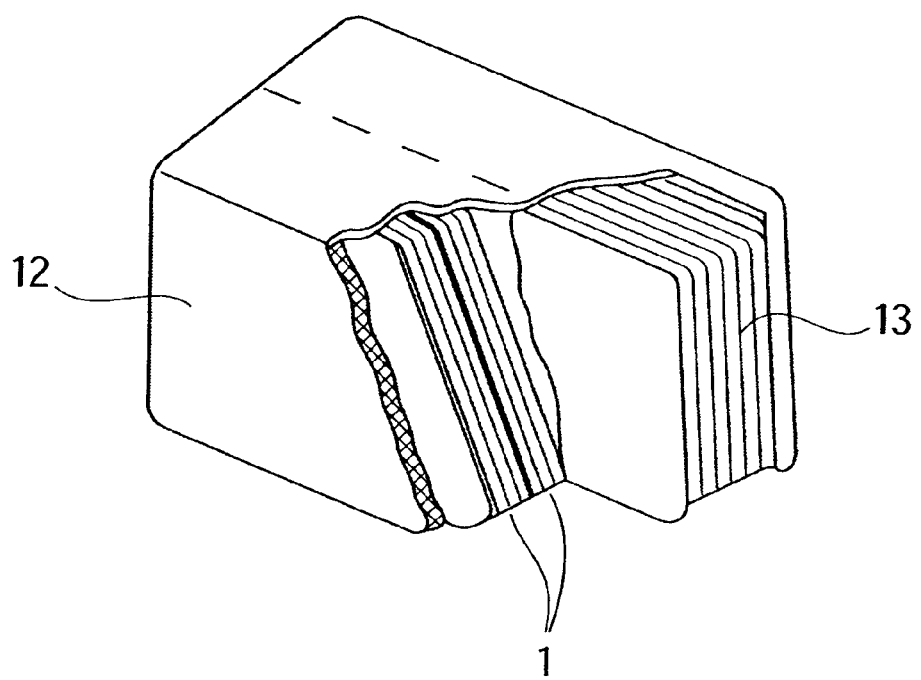
FIG. 4 shows a three-dimensional view of a multi-cell stack of wafer cells contained in an outer battery housing, according to the invention.

Alternatively, the stack may be contained in an outer battery housing 12, as shown in FIG. 4. To allow for electrode expansion and irregularities in the stack, the stack may be held in compression by means of a layer of sponge rubber, between one or both of the metal foil contacts and the end plates of the outer housing. A spring or a gas-filled compressible pad 13 or bladder may be also used instead of sponge rubber. Similarly, the battery may be contained in a housing with a honeycomb plate for lightweight ridge containment of a cell stack. For example, to reduce the weight of the end plates, ribbed designs or honeycomb sheets familiar to those skilled in the design of lightweight structures may be used. Also, if the cell stack is contained in an enclosed outer housing, the outer housing may serve to provide stack compression and the housing may be sealed or vented.

The multiple cells may each may have small vent ports and the cells may be contained in a sealed container which serves as the battery housing. If the cells are vented, the battery housing may be provided with a conventional pressure measuring device. Such a device may be a pressure gauge, a transducer and/or a pressure switch. The pressure measuring device may be used for monitoring the battery pressure and for regulating the magnitude and duration of the charging current during the charge cycle. Such regulation of the charging current is herein referred to as charge control. The stack may also contain internal tie rods to insure uniform compression and contact over the entire plane of the cells. The sealed container may further have a pressure relief valve to vent internal gases. The individual wafer cells 1 may be made according to the descriptions herein and other battery components, such as pressure gauges, etc., discussed above may be made using known methods or obtained from supply sources known to one skilled in the art.

For improved heat transfer, an additional metal foil layer or layers may be placed between or periodically between the cells, as desired. Alternatively, the cell edges may be extended to improve the thermal interface to the side walls of the battery housing. For example, for stable thermal operation, heat generated during battery operation should be removed from the perimeter of the battery. To improve internal heat transfer, an additional metal foil layer may be placed in the stack, as desired, for example such as adjacent to a metal layer and/or polymeric layer. Additionally, the cell edges may be extended to contact the side walls of the battery housing to insure thermal contact to the side walls.

The examples which follow describe the invention in detail with respect to showing how certain specific representative embodiments thereof can be made, the materials, apparatus and process steps being understood as examples that are intended to be illustrative only. In particular, the invention is not intended to be limited to the methods, materials, conditions, process parameters, apparatus and the like specifically recited herein.

Throughout this application, various patents have been referred to. The teachings and disclosures of each of these patents in their entireties are hereby incorporated by reference into this application to, for example, more fully describe the state of the art to which the present invention pertains.

It is to be understood and expected that variations in the principles of invention herein disclosed may be made by one skilled in the art and it is intended that such modifications are to be included within the scope of the present invention.

EXAMPLES OF THE INVENTION

Example 1

A single wafer cell including one positive nickel electrode and one negative metal hydride electrode was fabricated in an arrangement as shown in FIG. 1. The electrodes were prepared according to the procedures described in U.S. Pat. No. 5,393,617. In particular, the hydride electrode was prepared by blending a mixture of 45 grams of a Mischmetal hydride alloy, 0.5 grams of PTFE (Teflon®) powder and 4.5 grams of CuO. The Mischmetal hydride alloy used herein was comprised of an alloy of Mn $Ni_{3.5}Co_{0.7}Al_{0.8}$. The hydride alloy, received as about ⅛ to ¼ inch particles, was fragmented by dry pressure hydrating five times between vacuum and 200 psi to produce an average particle size of about 50 microns. The mixture was blended in a high speed blender for two 30-second periods. The mixture was then rolled out to a layer approximately 0.060 inch thick, and then folded and rolled to a 0.060 inch thickness in a direction about 90 degrees from the original direction. The above folding and rolling in the rotated direction was sequentially repeated seven times to a point wherein the (PTFE) Teflon® powder was fibrillated to form a fibrous, lace-like network which contained and bonded the other ingredients. For each step, the folding and rolling was carried out in a direction about 90 degrees from the folding and rolling direction of the immediately preceding step. The strip was then calendered to a final thickness of 0.020 inches. A 3×3 inch electrode, weighing 11 grams, was cut from the strip for assembly in the cell.

The nickel electrode was prepared using a method similar to that described for the hydride electrode. The mixture contained 1 gram of (PTFE) Teflon® powder, 1.5 grams of cobalt monoxide, 15 grams of graphite powder and 32.5 grams of nickel hydroxide powder. The final strip was calendered to a thickness of about 0.040 inches. A 3×3 inch electrode weighing 10 grams was cut from the strip. The electrode was then pressed at about 2,000 psi in a hydraulic press to a thickness of about 0.033 inches prior to assembly in the cell. Two layers of a non-woven nylon separator 3⅛×3⅛ inch square were placed between the electrodes.

The outer envelop of the cell was constructed from two electrically conductive laminations each prepared by bonding a 2 mil thick nickel foil, 3×3 inch square, to a 3 mil thick layer of polypropylene film that was 3¼×3¼ inch square. The bonding agent utilized was a solvent mixture of tar asphalt having a concentration of 30% solids. This bonding agent was painted on the foil, allowed to dry until tacky and then laminated to polypropylene by pressing lightly. The cement bonding layer was approximately 0.001 inches thick.

Prior to bonding, four ¼ inch diameter holes were punched through the polypropylene film with the use of a die at a spacing of 1½ inch on centers in a square pattern such that each contact point of nickel foil essentially served a quarter section of the electrode ¾×¾ inch square, as shown in FIG. 2A.

The cell was constructed by stacking the afore-described nickel electrode, separator layer and metal hydride electrode in the two outer lamination layers, as shown in FIG. 2B. The assembly was then heat sealed around the perimeter border to provide a ⅛ inch heat seal around the outer edges of the cell. The polypropylene film and metal foil of the lamination adjacent the negative electrode included a ⅛ inch hole in its center for electrolyte filling.

For testing purposes, a nickel foil contact plate with a thickness of 0.005 inches was placed on the outer positive and negative faces of the outer layers of the cell assembly. The cell assembly was then placed between two rigid acrylic plates which contained a filling port and peripheral bolts to hold the assembly together and maintain the cell in a compression for testing of individual cells.

Figure 5:
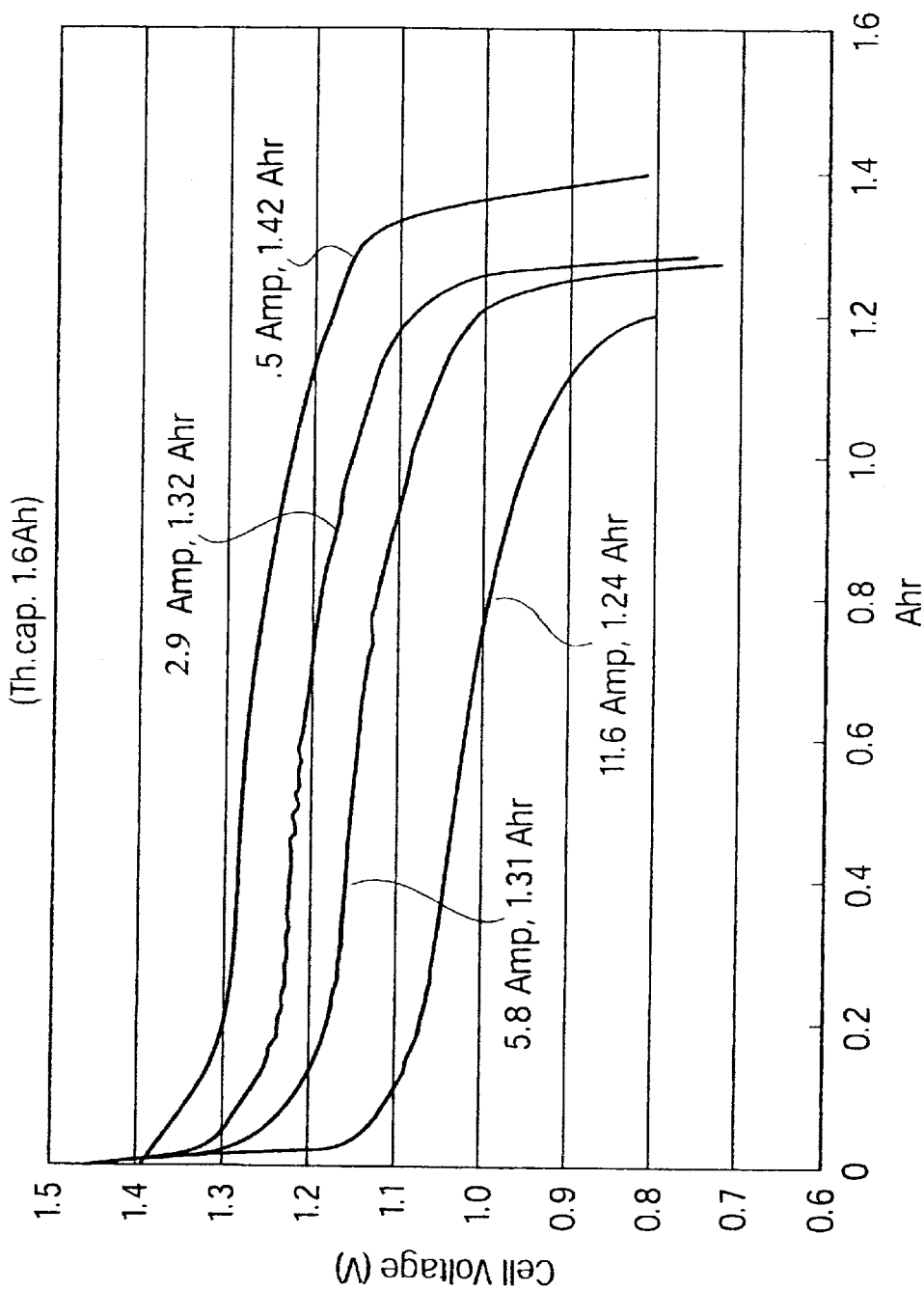
FIG. 5 shows the voltage for a cell, according to the invention, at different discharge currents.

The cell was then vacuumed filled by a technique in which a vacuum is drawn from the filling port to remove all air from the cell and then an electrolyte is allowed to flow back into the cell. Specifically, the cell was filled with 30% KOH-1% LiOH electrolyte, allowed to soak for 24 hours and then subjected to three formation cycles. Each formation cycle included 8½ hour charge at 200 mA and discharge at 500 mA to 0.8 volts, or a maximum elapsed time of 3½ hours. The cell was then tested at different discharge rates as shown in FIG. 5. The cell was recharged at the standard 8½ hour rate between recharges.

FIG. 5 shows the cell voltage of this cell at different discharge rates. The results obtained advantageously demonstrate the high rate capacity of the present invention.

Example 2

For comparison with the present invention and to demonstrate the advantageous results of the invention, a single cell was constructed as described in Example 1 except that the two sheets of 2 mil nickel foil, 3×3 inch square, of Example 1 were increased to 3¼×3¼ inch square, and the two 3 mil layers of polypropylene film that were 3¼×3¼ inch square were not utilized. The nickel foil sheets were then epoxy bonded directly around the perimeter of the cell. This edge seal served for temporary testing, but may allow electrolyte leakage under endurance testing.

Figure 6:
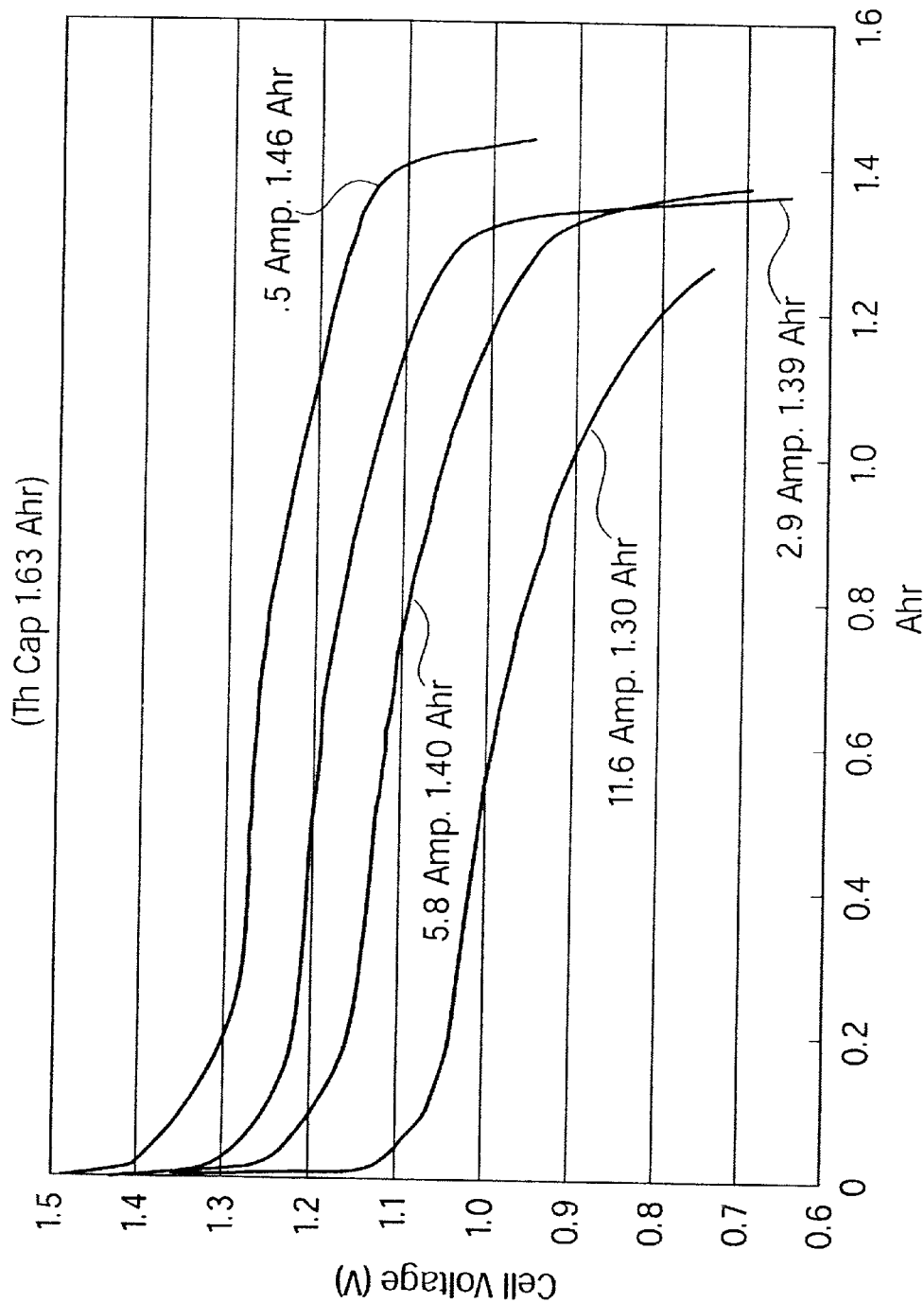
FIG. 6 shows the voltage for a cell, for comparison to the invention, at different discharge currents.

This cell configuration is not the subject of the present invention because it did not employ Applicant's advantageous laminations 5 and 6, as described herein. However, testing of this cell configuration under the conditions described in Example 1 was useful to demonstrate the advantages of Applicant's present design. In particular, testing demonstrated that the current power capacity of a cell without the outer polymeric film was similar to that of Applicant's invention described in Example 1 which included a polymeric film having the perforations therein to expose the metal foil and establish conduction through the cell. FIG. 6 shows the cell voltage of this cell different rates. A comparison of FIGS. 5 (re: Example 1) and 6 shows that the voltage characteristics are similar.

Example 3

In further contrast to the present invention, a cell was assembled and tested as in Example 1 except that the outer layers of the cell were made of a carbon-filled conductive polymeric material of polyvinyl chloride (pvc) nominally 4 mils thick and the outer edges of the cell were heat sealed to a non-conductive polymeric material of pvc to form the edge seal, as described in U.S. Pat. No. 5,393,617. Accordingly, Applicant's laminations of metallic foil/perforated polymeric layer were not employed.

Figure 7:
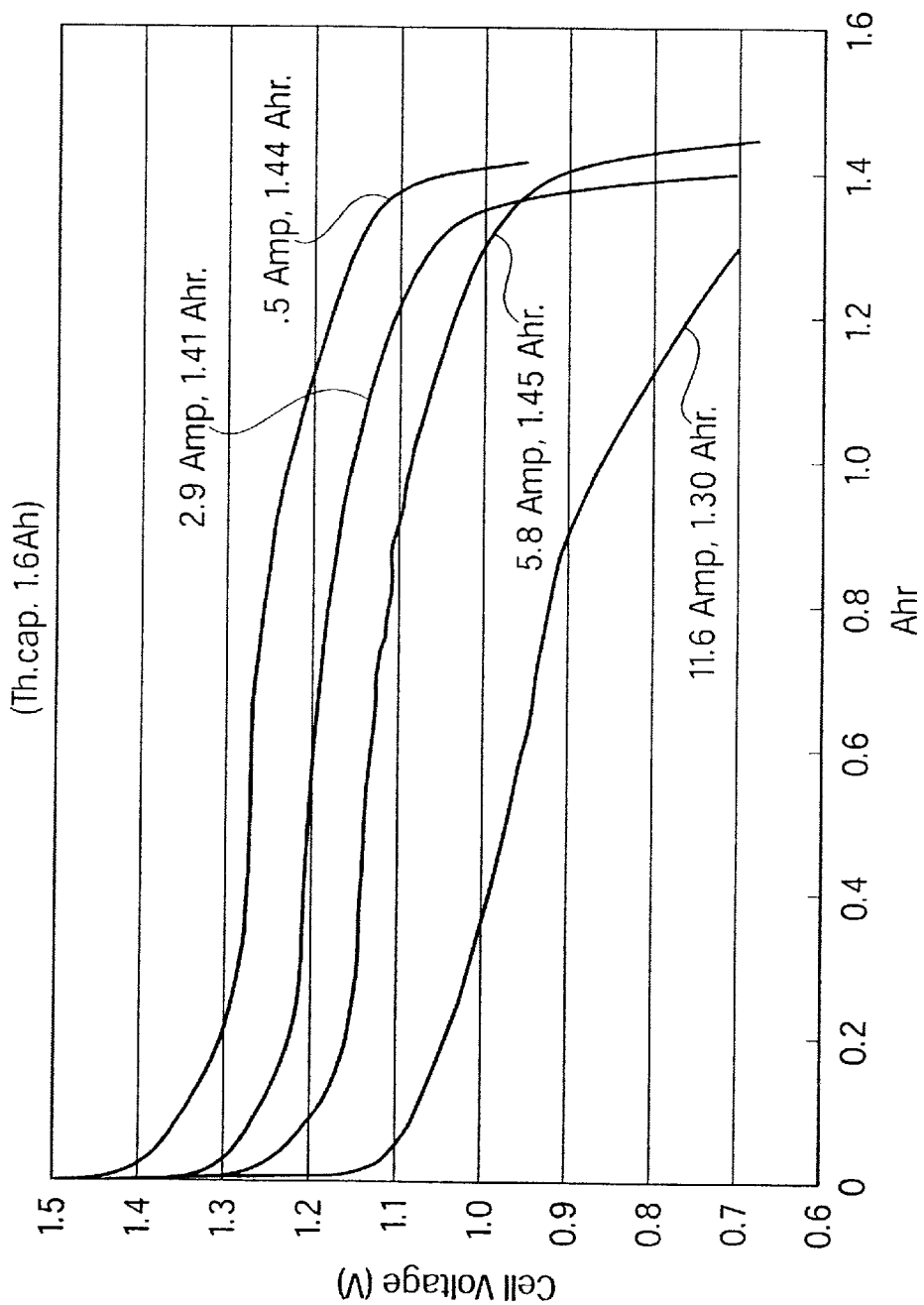
FIG. 7 shows the voltage for a cell, for comparison to the invention, at different rates.

This example demonstrated the less effective high rate current capabilities of the carbon-filled conductive outer film, as compared to that of Applicant's invention including its advantageous laminations. In particular, FIG. 7 shows the voltage current characteristics of this cell. A comparison of FIGS. 5 (re: Example 1) and 7 demonstrates that the present invention has a higher rate capability.

Example 4

In accordance with the present invention, a cell was constructed as in Example 1 except that in place of heat sealing the outer polymeric layers to form the perimeter outer seal, an epoxy cement was filled in along the border of the perimeter of the cell by injecting into the gap around the edges of the cell and allowed to cure for about 2 hours. After three formation cycles of 8.5 hours charge, 3.5 hours discharge, the excess electrolyte was drained from the cell by charging the cell in the upside down position to allow any free liquid to be ejected from the cell. After this step, a pressure gauge was then mounted into the fill port of the outer plastic acrylic plate to seal the internal compartment of the cell from the outside environment. The cell was then subjected to a life test at 40% depth of discharge on a cycle of 55 minutes of charge, 35 minutes of discharge at 0.72 and 1.1 amperes current, respectively.

Figure 8:
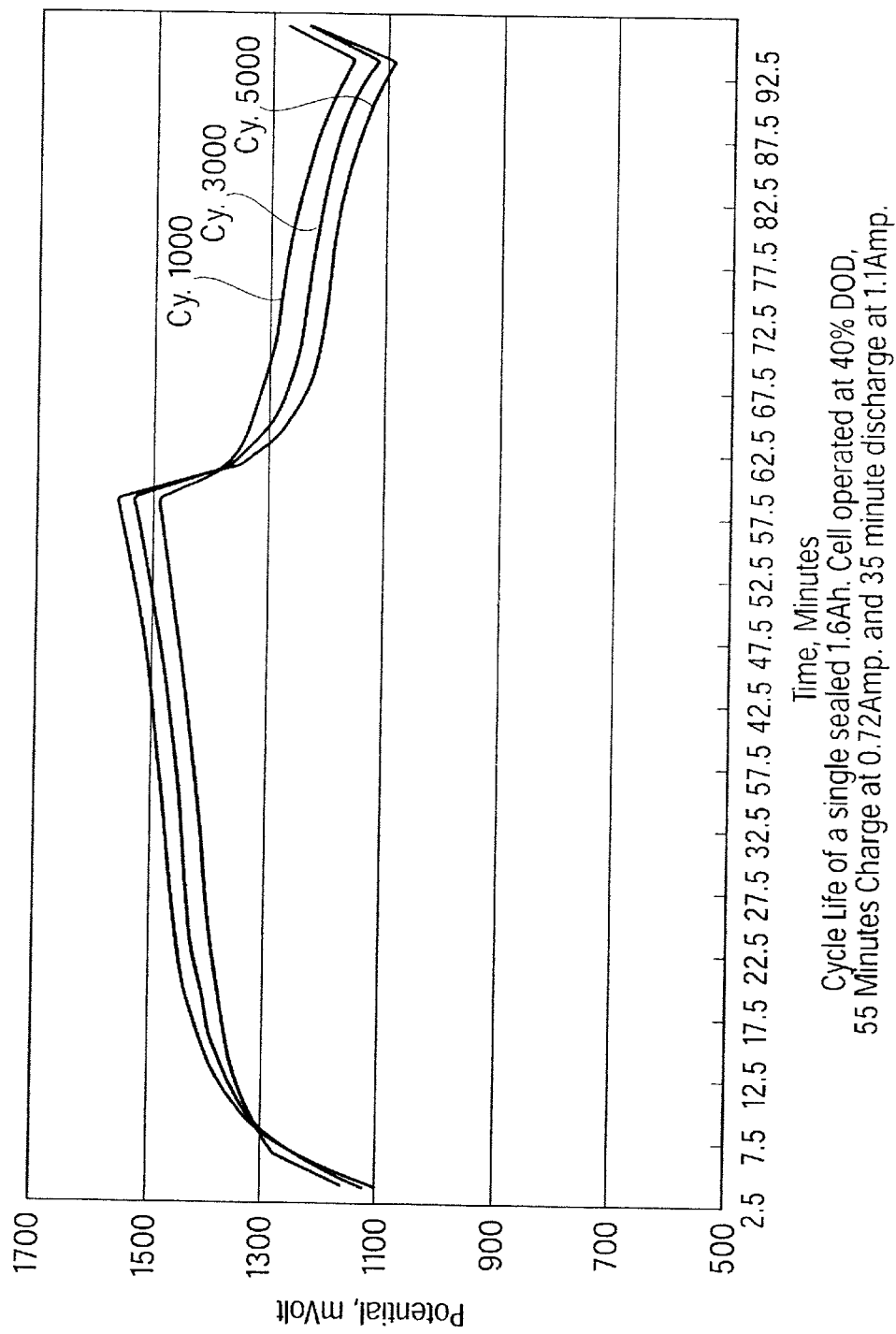
FIG. 8 shows the voltage vs. time (life test) for a cell, according to the invention.

FIG. 8 shows the voltage performance characteristics of this cell over testing for 5,000 cycles. As can be seen from this figure, stable performance was achieved, thus demonstrating the stability of the seal materials and design.

Example 5

According to the present invention, a cell was constructed in a configuration similar to Example 1 except the positive and negative electrodes were each 6×6 inches square. The laminations also each included a 6¼×6¼ inch polypropylene film bonded to a 1 mil metal foil, 6 inches square, using tar. Each polypropylene film included a ¼ inch diameter perforation pattern of 1 inch centers from hole to hole so that each contact point essentially serviced an electrode area 1×1 inch square.

Figure 9:
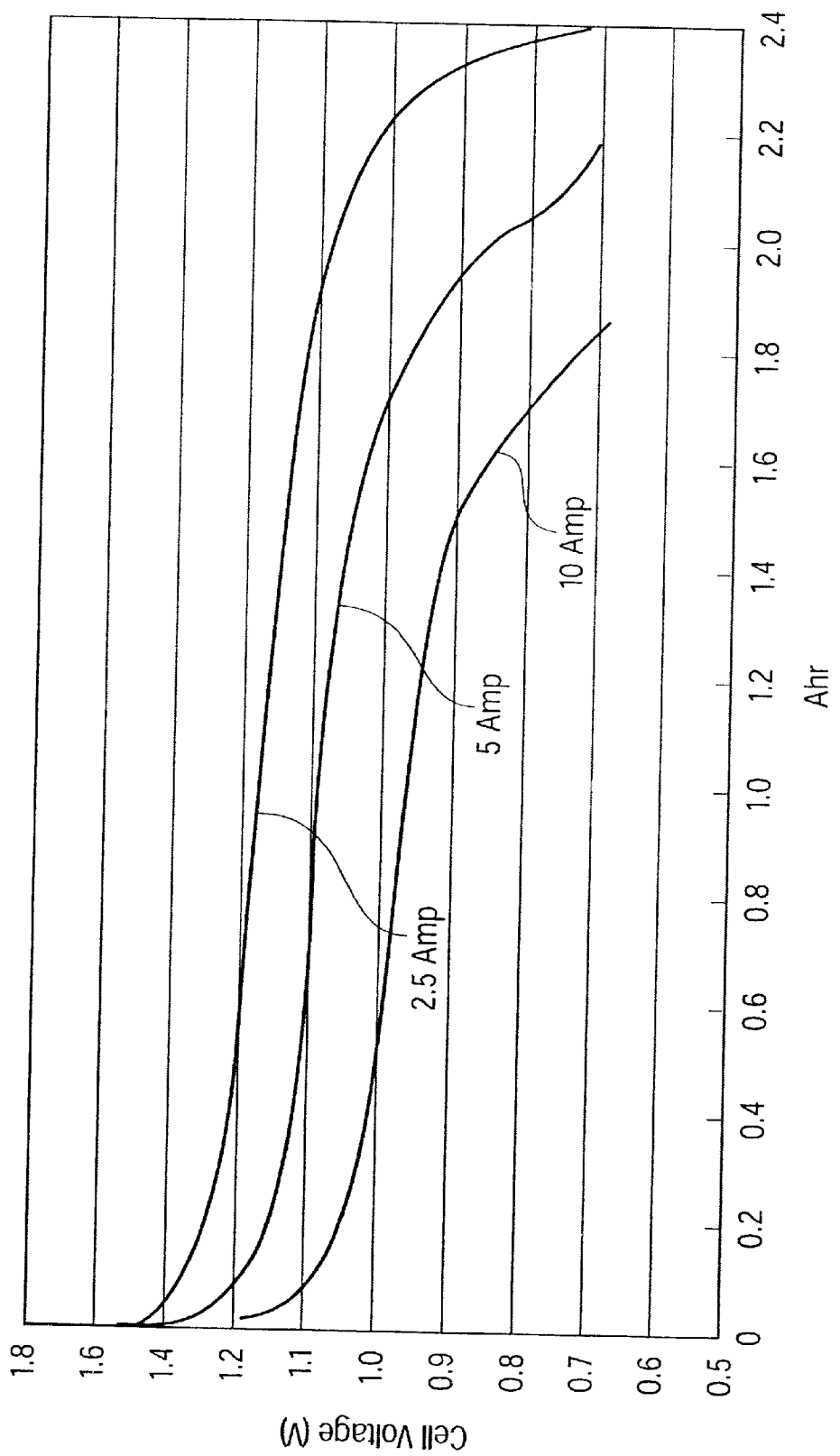
FIG. 9 shows the voltage for a cell, according to the invention, at different discharge rates.

FIG. 9 shows the voltage current characteristics of this cell at different discharge rates and demonstrates the high rate capability of the invention and the effectiveness of the seal design.

Example 6

Figure 10:
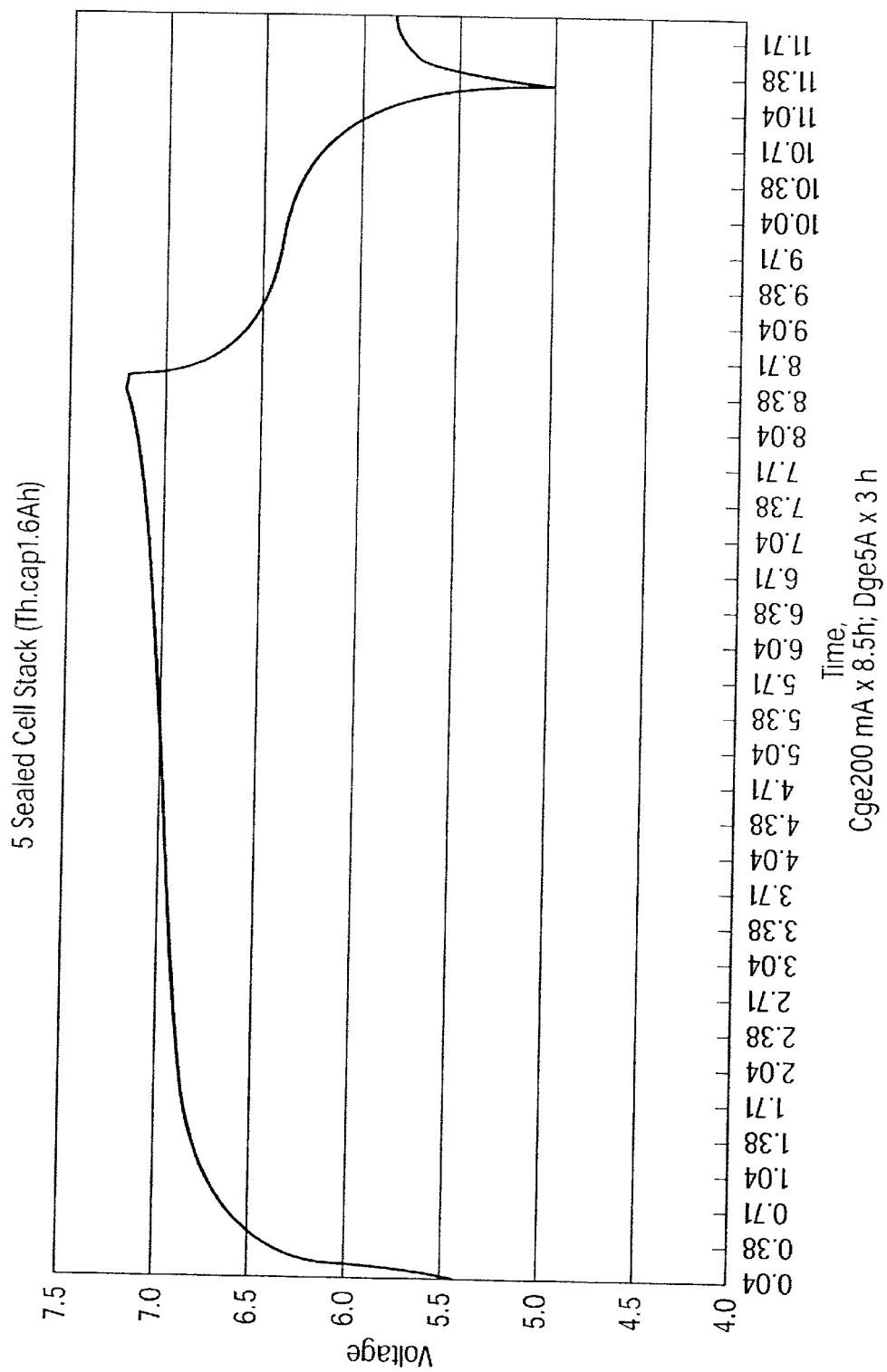
FIG. 10 shows the charge-discharge voltage for a cell stack, according to the invention.

In further accordance to the present invention, a stack of five sealed cells was assembled in an arrangement as shown in FIG. 3 to make a nominal 6 volt battery. The individual cell construction was the same as that of Example 4 except the fill port of each cell was sealed with a cemented patch. FIG. 10 shows the charge-discharge voltage of the stack.

FIG. 10 advantageously demonstrates that a multi cell stack may easily and effectively be constructed using Applicant's design.

In view of the foregoing examples and descriptions of the present invention, it can be seen that the present invention advantageously provides stable cycling sealed cell operation.

Another advantage of the present invention is high power capability.

A further advantage of the present invention is a convenient construction approach.

A still further advantage of the present invention is a cell and battery design that minimizes wasted space and has a high active to inert weight ratio.

What is claimed is:

1. A bipolar electrochemical battery comprising:
   a stack of at least two electrochemical cells electrically arranged in series with the positive face of each cell contacting the negative face of an adjacent cell, wherein each of the cells comprises
   (a) a negative electrode;
   (b) a positive electrode;
   (c) a separator between the electrodes, wherein the separator includes an electrolyte;
   (d) a first electrically conductive lamination comprising a first, inner metal layer and a first polymeric outer layer, said first polymeric outer layer having at least one perforation therein to expose the first, inner metal layer, said first electrically conductive lamination being in electrical contact with the outer face of the negative electrode; and
   (e) a second electrically conductive lamination comprising a second, inner metal layer and a second polymeric outer layer, said second polymeric outer layer having at least one perforation therein to expose the second, inner metal layer, said second electrically conductive lamination being in electrical contact with the outer face of the positive electrode; wherein the first and second laminations are sealed peripherally to each other to form an enclosure including the electrodes, the separator and the electrolyte.

2. The bipolar electrochemical battery of claim 1 wherein said electrodes, said separator and said first and second laminations are each substantially flat.

3. The bipolar electrochemical battery of claim 1 wherein said first and second inner metal layers are each a metal foil.

4. The bipolar electrochemical battery of claim 1 wherein the metal layer is between about 0.0003 inches and about 0.005 inches thick.

5. The bipolar electrochemical battery of claim 1 wherein the metal layer is made of a metal selected from copper, aluminum, silver, steel, lithium, nickel, metal plated materials and mixtures thereof.

6. The bipolar electrochemical battery of claim 1 wherein said first and second polymeric outer layers are each made of a polymeric material selected from polypropylene, polyethylene, polysulfone, polyvinyl chloride and mixtures thereof.

7. The bipolar electrochemical battery of claim 6 wherein said first and second polymeric outer layers are each a thin polymeric film between about 0.001 inches and about 0.005 inches in thickness.

8. The bipolar electrochemical battery of claim 1 wherein said first and second polymeric outer layers each comprise a plurality of perforations which are aligned with respect to each other to create contacts points through which current can flow from cell to cell.

9. The bipolar electrochemical battery of claim 1 wherein said positive electrode comprises a material selected from oxygen, magnesium, nickel, manganese, copper, cobalt, silver, lithium, an oxide or hydroxide of nickel, an oxide or hydroxide of manganese, an oxide or hydroxide of copper, an oxide or hydroxide of mercury, an oxide or hydroxide of silver, an oxide or hydroxide of magnesium, an oxide or hydroxide of lithium, an oxide or hydroxide of cobalt and combinations thereof.

10. The bipolar electrochemical battery of claim 9 wherein said positive electrode is an oxygen electrode or a nickel electrode.

11. The bipolar electrochemical battery of claim 3 wherein at least one metal foil and polymeric layer are bonded together with tar, epoxy or rubber cement.

12. The bipolar electrochemical battery of claim 11 wherein said nickel electrode is selected from a pasted foam, sintered and plastic bonded nickel electrode.

13. The bipolar electrochemical battery of claim 1 wherein said negative electrode comprises a material selected from cadmium, iron, zinc, silver, lithium, carbon containing lithium, hydrogen and mixtures thereof.

14. The bipolar electrochemical battery of claim 1 wherein said negative electrode is a metal hydride electrode.

15. The bipolar electrochemical battery of claim 14 wherein the metal hydride electrode is selected from the group consisting of a nickel hydride electrode, a copper hydride electrode, a lithium hydride electrode, an iron hydride electrode and mixtures thereof.

16. The bipolar electrochemical battery of claim 1 wherein the separator is porous.

17. The bipolar electrochemical battery of claim 1 wherein the first and second polymeric outer layers are sealed to each other to form the enclosure.

18. The bipolar electrochemical battery of claim 1 wherein a conductive paste or cement is present between at least one of said metal layers and said electrode with which it is in contact.

19. The bipolar electrochemical battery of claim 1 wherein said stack of at least two electrochemical cells is contained in a battery housing.

20. The bipolar electrochemical battery of claim 19 wherein a pressure measuring device is included in said sealed battery housing.

21. The bipolar electrochemical battery of claim 19 wherein each electrochemical cell is completely sealed.

22. The bipolar electrochemical battery of claim 19 wherein a conductive paste or cement is present between said cells.

23. The bipolar electrochemical battery of claim 19 wherein at least one of the end cells of said stack of cells is in contact with a metal foil contact, wherein said metal foil contact is electrically connected to a battery terminal.

24. The bipolar electrochemical battery of claim 19 wherein said stack of cells is held in compression.

25. The bipolar electrochemical battery of claim 19 wherein said electrochemical cells include vent ports.

26. The bipolar electrochemical battery of claim 19 wherein a plurality of cells are held in compression.

27. The bipolar electrochemical battery of claim 26 wherein the cells are held in compression by a gas filled bladder.

28. The bipolar electrochemical battery of claim 19 wherein a metal foil layer is placed between cells for thermal conduction.

29. The bipolar electrochemical batter of claim 19 wherein a cell edge is extended for improved thermal contact to battery housing walls.

30. The bipolar electrochemical battery of claim 19 wherein the battery is contained in a housing with a honeycomb plate for lightweight ridge containment of a cell stack.

31. The electrochemical wafer cell of claim 30 wherein the first inner metal layer and the first polymeric outer layer are boned together with tar, epoxy or rubber cement, and the second inner metal layer and the second polymeric outer layer are bonded together with tar, epoxy or rubber cement.

32. An electrochemical wafer cell comprising:
    (a) a negative electrode;
    (b) a positive electrode;
    (c) a separator between the electrodes, wherein the separator comprises an electrolyte;
    (d) a first electrically conductive lamination comprising a first inner metal layer and a first polymeric outer layer, said first polymeric outer layer having at least one perforation therein to expose the first inner metal layer, said first electrically conductive lamination being in electrical contact with the outer face of the negative electrode; and
    (e) a second electrically conductive lamination comprising a second inner metal layer and a second polymeric outer layer, said second polymeric outer layer having at least one perforation therein to expose the second inner metal layer, said second electrically conductive lamination being in electrical contact with the outer face of the positive electrode; wherein the first and second laminations are sealed peripherally to each other to form an enclosure including the electrodes, the separator and the electrolyte.

33. An assembly for containing contents of a wafer cell, comprising:
    (a) a first electrically conductive lamination comprising a first inner metal layer and a first polymeric outer layer, said first polymeric outer layer having at least one perforation therein to expose the first inner metal layer, said first electrically conductive lamination capable of being in electrical contact with a negative electrode; and
    (b) a second electrically conductive lamination comprising a second inner metal layer and a second polymeric outer layer, said second polymeric outer layer having at least one perforation therein to expose the second inner metal layer, said second electrically conductive lamination capable being in electrical contact with a positive electrode, wherein the first and second laminations are capable of being sealed peripherally to each other to form an assembly for containing the contents of a wafer cell.

34. A method of making a bipolar electrochemical battery comprising the steps of:
    providing a stack of at least two electrochemical cells electrically arranged in series with the positive face of each cell contacting the negative face of an adjacent cell, wherein each of the cells comprises
    (a) a negative electrode;
    (b) a positive electrode;
    (c) a separator between the electrodes, wherein the separator comprises an electrolyte;

(d) a first electrically conductive lamination comprising a first, inner metal layer and a first polymeric outer layer, said first polymeric outer layer having at least one perforation therein to expose the first, inner metal layer, said first electrically conductive lamination being in electrical contact with the outer face of the negative electrode; and (e) a second electrically conductive lamination comprising a second, inner metal layer and a second polymeric outer layer, said second polymeric outer layer having at least one perforation therein to expose the second, inner metal layer, said second electrically conductive lamination being in electrical contact with the outer face of the positive electrode; and sealing the first and second laminations peripherally to each other to form an enclosure including the electrodes, the separator and the electrolyte.

35. The electrochemical wafer cell of claim 32 wherein the cell has extended edges.

* * * * *

UNITED STATES PATENT AND TRADEMARK OFFICE
CERTIFICATE OF CORRECTION

PATENT NO.     : 6,503,658 B1
DATED          : January 7, 2003
INVENTOR(S)    : Klein et al.

It is certified that error appears in the above-identified patent and that said Letters Patent is hereby corrected as shown below:

<u>Column 6,</u>
Line 33, change "polysultone" to -- polysulfone --.

Signed and Sealed this

Thirtieth Day of March, 2004

JON W. DUDAS
*Acting Director of the United States Patent and Trademark Office*